(12) United States Patent
Kim

(10) Patent No.: US 9,085,013 B2
(45) Date of Patent: Jul. 21, 2015

(54) LINEAR VIBRATOR

(75) Inventor: Jin Hoon Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 294 days.

(21) Appl. No.: 13/601,857

(22) Filed: Aug. 31, 2012

(65) Prior Publication Data

US 2013/0342035 A1  Dec. 26, 2013

(30) Foreign Application Priority Data

Jun. 22, 2012 (KR) .................. 10-2012-0067402

(51) Int. Cl.
*B06B 1/04* (2006.01)
*H02K 33/16* (2006.01)

(52) U.S. Cl.
CPC ............... *B06B 1/045* (2013.01); *H02K 33/16* (2013.01)

(58) Field of Classification Search
CPC ............................... H02K 33/00; H02K 1/34
USPC ..................................................... 310/15, 25
See application file for complete search history.

(56) References Cited

U.S. PATENT DOCUMENTS

| | | | |
|---|---|---|---|
| 8,872,394 B2 * | 10/2014 | Shim et al. ...................... | 310/25 |
| 2011/0198948 A1 * | 8/2011 | Keisuke et al. .................. | 310/25 |
| 2011/0278961 A1 * | 11/2011 | Jeong ............................... | 310/25 |
| 2012/0319506 A1 * | 12/2012 | Shim et al. ....................... | 310/25 |
| 2013/0119787 A1 * | 5/2013 | Yu .................................... | 310/25 |
| 2013/0134804 A1 | 5/2013 | Kim | |
| 2013/0187502 A1 * | 7/2013 | Kim ............................. | 310/152 |
| 2013/0342034 A1 * | 12/2013 | Moon et al. ..................... | 310/25 |

FOREIGN PATENT DOCUMENTS

| | | |
|---|---|---|
| KR | 10-1101330 B1 | 12/2011 |
| KR | 101142284 B1 | 5/2012 |
| KR | 10-1156867 B1 | 6/2012 |

OTHER PUBLICATIONS

Korean Office Action Issued in Korean Application No. 10-2012-0067402 dated May 22, 2013 with English Translation.

* cited by examiner

*Primary Examiner* — Thanh Lam
(74) *Attorney, Agent, or Firm* — McDermott Will & Emery LLP

(57) ABSTRACT

There is provided a linear vibrator, including: a housing providing an internal space; an electromagnet having one end fixed to the housing so as to be disposed in the internal space; a vibrating part including a magnet facing the electromagnet and interacting therewith; an elastic member having one end fixed to the housing and the other end fixed to the vibrating part and elastically supporting the vibrating part during vibrating thereof; and a separation prevention member interposed between the other end of the electromagnet and the housing.

9 Claims, 4 Drawing Sheets

LINEAR VIBRATOR

CROSS-REFERENCE TO RELATED APPLICATIONS

This application claims the priority of Korean Patent Application No. 10-2012-0067402 filed on Jun. 22, 2012, in the Korean Intellectual Property Office, the disclosure of which is incorporated herein by reference.

BACKGROUND OF THE INVENTION

1. Field of the Invention

The present invention relates to a linear vibrator.

2. Description of the Related Art

In recent years, a personal mobile terminal having a large liquid crystal display (LCD) screen for a user's convenience has been increasingly released onto the market. In line with this trend, a touch screen type display device has been greatly favored, and a vibration motor has been used so as to generate vibrations when a touch is applied to a touch screen.

A vibration motor transforms electrical energy into mechanical energy using a principle of generating electromagnetic force, is mounted on a personal mobile terminal, and is used for silent call reception notification.

According to the related art, rotatory power is generated to rotate a rotational part of an unbalance mass, thereby obtaining mechanical vibrations. In this case, rotatory power is generated such that it is subjected to a rectifying action through a brush and a contact point of a commutator (or rectifier) to obtain mechanical vibrations.

However, in the brush type structure using a commutator, when the motor rotates, the brush passes through a gap between segments of the commutator, causing mechanical friction and an electrical spark, producing foreign objects and thereby shortening the life span of the motor.

In addition, because voltage is applied to the motor by using a moment of inertia, time is taken to reach a target amount of vibrations, so it is difficult to implement vibrations suitable for a touch screen.

In order to overcome such disadvantages in terms of the life span and response of the motor and implement the vibration function of the touch screen, a linear vibrator is increasingly being used.

A linear vibrator, rather than using the rotational principle of the motor, uses the following principle: when electromagnetic force, obtained by using a spring installed inside a vibration motor and a mass body hung on the spring, is generated periodically in conformity with a resonance frequency, resonance is caused, thereby generating vibrations.

The linear vibrator needs to be slimmed and efficiently produced in order to meet a market trend in which miniaturization and slimness of portable electronic devices are demanded, while performance and characteristics thereof should not be affected, even in the case that several different factors are applied.

In particular, a linear vibrator mounted in an internal space of a housing largely has a vibrating part and a fixed part, wherein the fixed part is fixed to the housing and the vibrating part is vibrated through electromagnetic interaction with the fixed part. In this configuration, the fixed part, fixed to the housing, may be separated from the housing due to an external shock, or the like, applied to the linear vibrator.

Patent Document 1 discloses that fixed parts, that is, a yoke 15 and a coil 14 are fixed to a bracket 11 and only one end thereof is fixed to the bracket 11 and therefore, the yoke 15 may be separated from the bracket 11 when an external shock, or the like, is applied thereto.

RELATED ART DOCUMENT (Patent Document 1) Korean Patent No. 10-1101330

SUMMARY OF THE INVENTION

An aspect of the present invention provides a linear vibrator capable of maintaining a state in which a fixed part is firmly fixed to a housing, even in the case that an external shock, or the like, is applied thereto.

According to an aspect of the present invention, there is provided a linear vibrator, including: a housing providing an internal space; an electromagnet having one end fixed to the housing so as to be disposed in the internal space; a vibrating part including a magnet facing the electromagnet and interacting therewith; an elastic member having one end fixed to the housing and the other end fixed to the vibrating part and elastically supporting the vibrating part during vibrating thereof; and a separation prevention member interposed between the other end of the electromagnet and the housing.

The linear vibrator may further include a shock absorbing member inserted between the separation prevention member and the other end of the electromagnet.

At least a portion of the separation prevention member may be formed of an elastomer.

The separation prevention member may be formed of a magnetic material.

The separation prevention member may be formed of a non-magnetic material.

The housing may include an external wall protruded into the internal space, and the separation prevention member may be inserted into an interior of the external wall.

The electromagnet may include a yoke fixed to the housing and a coil wound around the yoke.

One end of the yoke may be inserted into a seating groove or a seating hole formed in the housing.

The other end of the yoke may be provided with a flange protruded in an outer radial direction.

The flange may be disposed to face the magnet.

According to another aspect of the present invention, there is provided a linear vibrator, including: a housing providing an internal space; a magnetic field part having one end fixed to the housing so as to be disposed in the internal space; a vibrating part including an electromagnet facing the magnetic field part and interacting therewith; an elastic member having one end fixed to the housing and the other end fixed to the vibrating part and elastically supporting the vibrating part during vibrating thereof; and a separation prevention member interposed between the other end of the magnetic field part and the housing.

The other end of the magnetic field part may be provided with a yoke.

The magnetic field part may include a yoke fixed to the housing and a magnet inserted into the yoke.

One end of the yoke may be inserted into a seating groove or a seating hole formed in the housing.

The other end of the yoke may be provided with a flange protruded in an outer radial direction.

The linear vibrator may further include a shock absorbing member inserted between the separation prevention member and the other end of the magnetic field part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
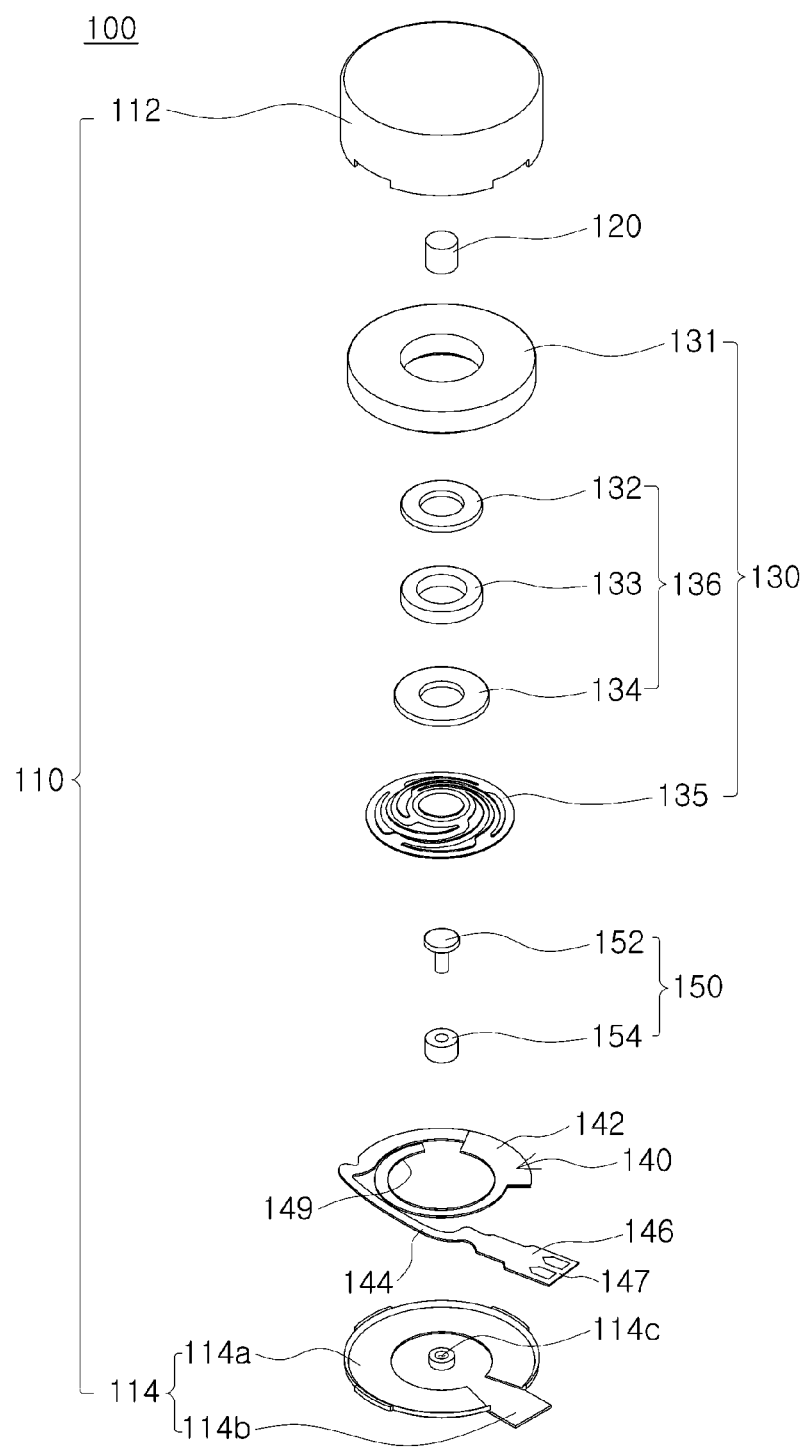
FIG. 1 is an exploded perspective view illustrating a linear vibrator according to an embodiment of the present invention.

Hereinafter, exemplary embodiments of the present invention will be described with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same reference numerals will be used to designate the same or like elements.

Figure 2:
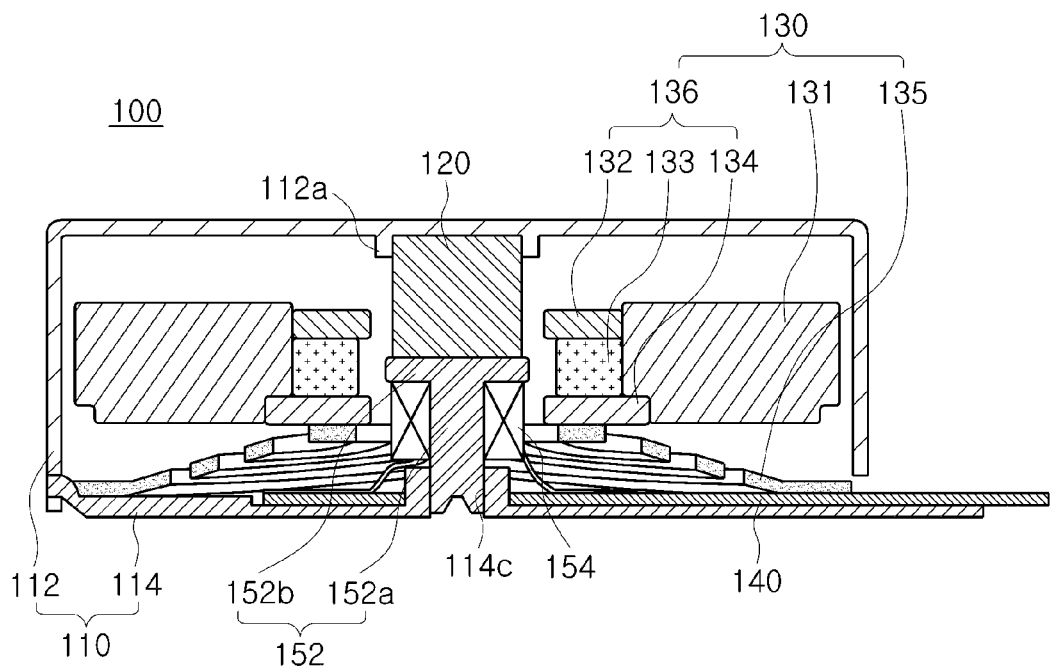
FIGS. 2 and 3 are cross-sectional views illustrating a linear vibrator according to an embodiment of the present invention.
Figure 3:
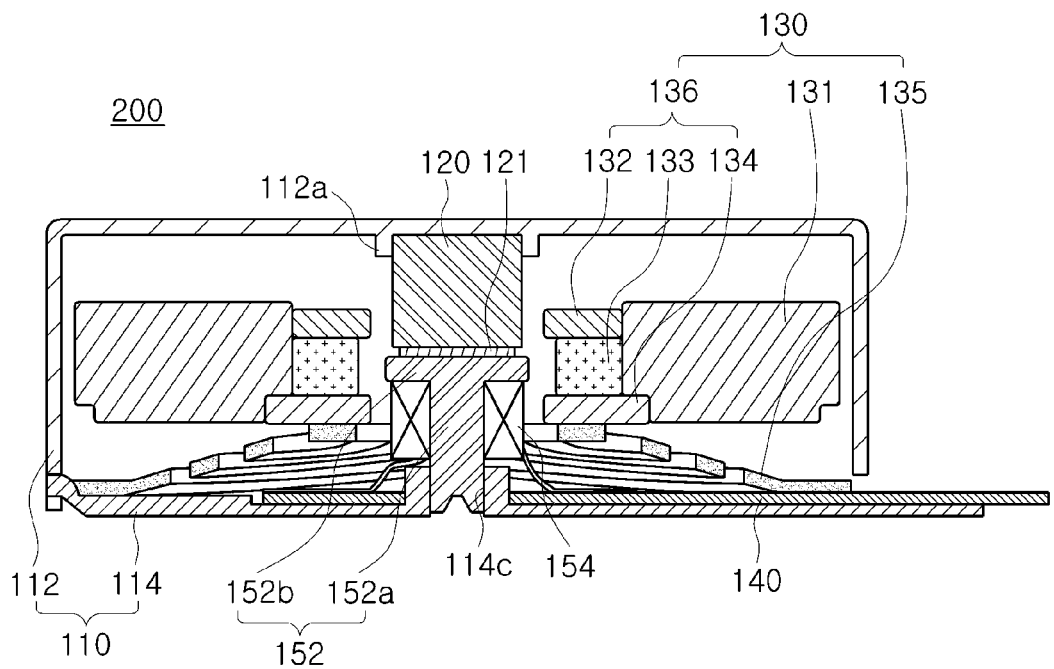

FIG. 1 is an exploded perspective view illustrating a linear vibrator according to an embodiment of the present invention, and FIGS. 2 and 3 are cross-sectional views illustrating a linear vibrator according to an embodiment of the present invention.

First, defining terms related to directions, an inner or outer radial direction may refer to a direction from a center of a case 112 toward an external circumferential surface of the case 112, and vice versa. In addition, a circumferential direction may refer to a circumferential direction (including both a clockwise direction and a counterclockwise direction) of the case 112.

Referring to FIGS. 1 and 2, a linear vibrator 100 according to an embodiment of the present invention may include a housing 110 forming an exterior of the linear vibrator 100, a vibrating part 130 including a mass body 131, an elastic member 135 and a magnetic field part 136, an electromagnet 150 including a yoke 152 and a coil 154, and a substrate 140 for supplying power to the electromagnet 150. In addition, in the embodiment of the present invention, a separation prevention member 120 may be interposed between the electromagnet 150 and the housing 110.

Here, the magnetic field part 136 may include upper and lower plates 132 and 134 acting as a yoke and a magnet 133 interposed therebetween. Further, the electromagnet 150 may include the yoke 152 and the coil 154.

The housing 110 may include the case 112 having an opened portion and providing an internal space having a predetermined volume, and the bracket 114 joined to the opened portion of the case 112 to seal the internal space formed by the case 112.

Here, the internal space may accommodate the electromagnet 150, the vibrating part 130, and the like, and the case 112 and the bracket 114 may also be integrally formed.

In addition, the bracket 114 may include a sealing portion 114a sealing the opened portion of the case 112 and a protruding portion 114b protruded to the outside of the case 112 after being joined to the case 112.

Meanwhile, an external wall 112a is provided on a top surface of the case 112 to be protruded downwardly to correspond to an external edge of the separation prevention member 120 to be described below to thereby allow the external circumferential surface of the separation prevention member 120 to be fitted into an internal surface of the external wall 112a, such that the external wall 112a of the case 112 can be more firmly joined to the separation prevention member 120.

The electromagnet 150 may be fixed to the housing 110 so as to be mounted in the internal space of the housing 110. The electromagnet 150 may be joined to the housing 110 (may be mounted in the case 112 or on the bracket 114) by at least one of bonding, press-fitting, and welding.

The electromagnet 150 may have an external diameter smaller than internal diameters of the upper and lower plates 132 and 134 and the magnet 133 forming the magnetic field part 136 and may act as a fixed member by being joined to the housing 110 (the case 112 or the bracket 114).

In this configuration, the electromagnet 150 may be configured to include the yoke 152 fixed to the housing 110 and the coil 154 wound around the yoke 152. The yoke 152 may be provided so as to smooth a flow of magnetic flux during a process of generating electromagnetic force through interaction between the coil 154 and the magnet 133 of the vibrating part 130.

One end of the yoke 152 may be inserted into a seating groove or a seating hole 114c formed in the housing 110. Further, the yoke 152 may be fixed to the housing 110 using various methods such as bonding, press-fitting, welding, and the like, but the present invention is not limited thereto. FIGS. 1 and 2 show that the yoke 152 is inserted into the seating hole 114c formed in the bracket 114, but the present invention is not limited thereto. Therefore, the seating hole may also be provided as a seating groove and may fix the yoke to the housing rather than to the bracket.

Further, the yoke 152 may include a body 152a inserted into the housing 110 and a flange 152b protruded from the other end of the yoke 152 in the outer radial direction. Here, the flange 152b may be disposed to face the magnet 133 of the vibrating part 130. This configuration of the yoke 152 may smooth the flow of magnetic flux during the process of generating electromagnetic force through interaction between the coil 154 and the magnet 133.

Here, the yoke 152 may be formed of a magnetic material.

In addition, a lead wire of the coil 154 may be connected to the substrate 140 that is mounted in the housing 110. Further, the substrate 140 may be a flexible circuit board and be directly attached to a bottom surface of the coil 154 (a method illustrated in FIG. 5). When current having a predetermined frequency is applied to the coil 154, a magnetic field may be induced around the coil 154.

The vibrating part 130 may include the mass body 131, the elastic member 135, and the magnetic field part 136. In this configuration, the magnetic field part 136 may include the upper and lower plates 132 and 134 and the magnet 133 interposed therebetween.

One end of the elastic member 135 may be fixed to the mass body 131 having the magnetic field part 136 mounted therein and the other end thereof may be fixed to the housing 110 (fixed to the case 112 or to the bracket 114).

The magnetic field part 136 is fixed to the interior of the mass body 131 to interact with the electromagnet 150 fixed to the housing 110 so as to face the interior of the magnetic field part 136, such that the magnetic field part 136 may be used to vibrate the vibrating part 130 relative to the electromagnet 150 via the elastic member 138.

That is, the vibrating part 130 may be a member that can vibrate vertically via the elastic member 135.

Here, the upper and lower plates 132 and 134 and the magnet 133 may include an internal diameter larger than an external diameter of the electromagnet 150.

In detail, the magnetic field part 136 may be disposed to face the electromagnet 150 and at least a portion of the electromagnet 150 may be inserted into a space formed by the magnetic field part 136.

Therefore, the electromagnet 150 and the magnetic field part 136 may maintain a state of non-contact during the movement of the vibrating part 130.

Further, the magnet 133 may be joined to an internal circumferential surface of a hollow of the mass body 131.

The mass body 131 is a vibrating body that is vibrated vertically. When the mass body 131 is vibrated vertically, the mass body may have an external diameter smaller than an internal diameter of the internal circumferential surface of the case 112 so as to be vibrated without coming into contact in the housing 110.

Therefore, a gap having a predetermined size may be formed between the internal circumferential surface of the case 112 and the external circumferential surface of the mass body 131.

The mass body 131 may be formed of a non-magnetic material or a paramagnetic material that is not affected by magnetic force generated by the magnet 133.

Therefore, the mass body 131 may be formed of a material such as tungsten having a heavier specific gravity than iron, which increases a mass of the vibrating part 130 without an increase in volume to control a resonance frequency, thereby maximizing a vibration quantity.

However, a material of the mass body 131 is not limited to tungsten and various materials can be used according to designer's intention.

Here, in order to calibrate a natural frequency of the linear vibrator 100, the mass body 131 is provided with a space into which a sub mass body may be inserted, thereby increasing or reducing the mass of the mass body 131.

When current having a predetermined frequency is applied to the coil 154, a magnetic field may be induced around the coil 154. In this case, when electromagnetic force is propagated through the coil 154, a direction of magnetic flux through the coil 154 from the magnet 133 is horizontal, while the magnetic field generated by the coil 154 is vertically formed to vibrate the vibrating part 130 vertically.

Therefore, the magnetic flux direction of the magnet 133 and the vibration direction of the vibrating part 130 are perpendicular with regard to each other.

That is, when electromagnetic force having the same frequency as the natural mechanical frequency of the vibrating part 130 is formed, the vibrating part 130 may be resonance-vibrated to obtain a maximum quantity of vibrations and the natural frequency of the vibrating part 130 is affected by the mass of the vibrating part 130 and an elasticity modulus of the elastic member 135.

Here, current, namely, external power having a predetermined frequency, applied to the coil 154 may be provided by the substrate 140 electrically connected to the coil 154, which will be described below.

As described above, the elastic member 135 is a member that is joined to the mass body 131 and the housing 110 (the case 112 or the bracket 114) to provide elastic force, wherein the natural frequency of the vibrating part 130 is affected by the elasticity modulus of the elastic member 135.

Here, the elastic member 135 may be one of a coil spring and a leaf spring, but the present invention is not limited thereto. Therefore, it is to be noted that any member capable of providing elastic force may be used without limitation.

The substrate 140 may be electrically connected to the lead wire of the coil 154 configuring the electromagnet 150.

The substrate 140 may include a through hole 149 into which the electromagnet 150 fixed to the housing 110 is inserted during the process of mounting the substrate 140 in the housing 110. The substrate 140 may be easily mounted in the housing 110 due to the through hole 149.

In detail, the substrate 140 may be mounted so as to be entirely adhered to the housing 110 and the lead wire of the coil 154 may extend to be electrically connected to the substrate 140.

Alternatively, the substrate 140 may be a flexible printed circuit board and may include a moving piece 142 coupled to the coil 154, a fixed piece 146 coupled to the protruding portion 114b of the bracket 114, and a connecting piece 144 connecting the moving piece 142 and the fixed piece 146 to each other.

Figure 5:
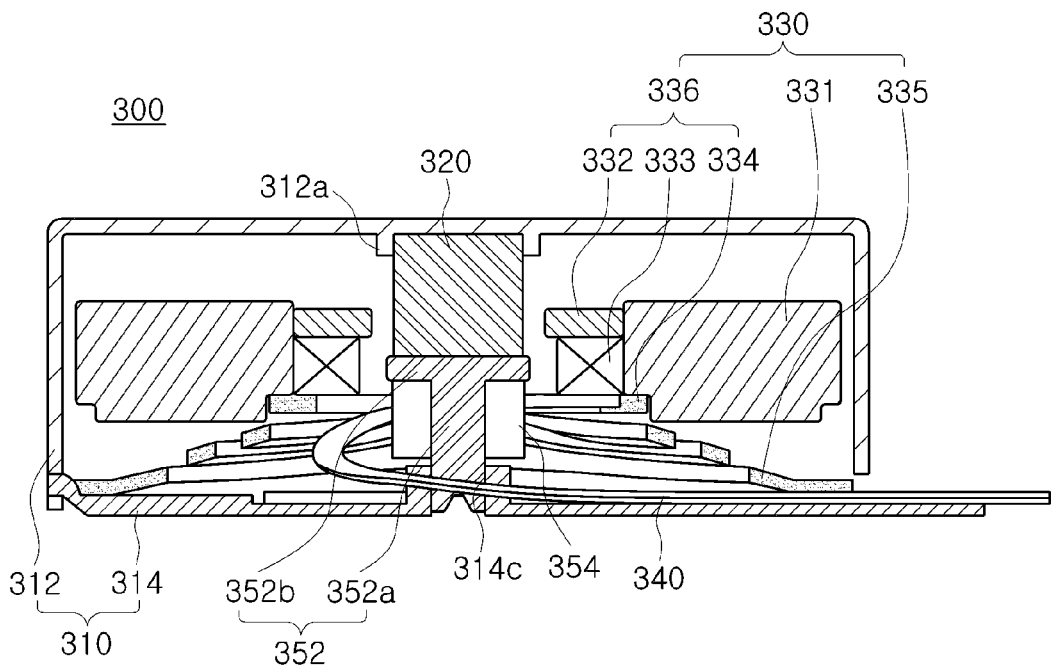
FIGS. 5 and 6 are cross-sectional views illustrating a linear vibrator according to an embodiment of the present invention.

The moving piece 142 may be coupled to a bottom surface of the coil 154 without being adhered to the bracket 114 (please see the structure for coupling the substrate to the coil of FIG. 5).

In addition, the internal space formed by the moving piece 142 may refer to the above-mentioned through hole 149.

A top surface of the fixed piece 146 may be provided with a power connection terminal 147 for supplying power to the coil 154 and may be protruded to the outside of the case 112.

Therefore, the fixed piece 146 of the substrate 140 may be coupled to the protruding portion 114b.

In addition, the substrate 140 may include the connecting piece 144 connecting the moving piece 142 and the fixed piece 146 to each other, wherein the connecting piece 144 may be provided to be pivoted in a circumferential direction of the moving piece 142 from an end of the fixed piece 146 at a predetermined gap with respect to an edge of the moving piece 142.

In addition, the bottom surface of the substrate 140 may be provided with an electrode pad (not shown) for transferring an electrical signal having a specific frequency to the coil 154 and the electrode pad may be electrically connected to the lead wire of the coil 154.

Here, the electrode pad may be formed further outwardly than the external edge of the coil 154 and the electrode pad, and the electrode pad and the lead wire of the coil 154 may be electrically connected by soldering.

In other words, the electrode pad may be formed on the bottom surface of the moving piece 142 of the substrate 140 to be coupled to the lead wire of the coil 154.

The separation prevention member 120 may be interposed between the other end of the electromagnet 150 and the housing 110. In detail, when the other end of the electromagnet 150 is fixed to the bracket 114, the separation prevention member 120 may be interposed between the other end of the electromagnet 150 and the case 112.

The linear vibrator mounted in the internal space of the housing 110 is largely divided into the vibrating part and the fixed part, wherein the fixed part is fixed to the housing and the vibrating part is vibrated by the electromagnetic interaction with the fixed part. In this configuration, the fixed part fixed to the housing may be separated from the housing due to an external shock applied to the linear vibrator, or the like. Therefore, the present invention may additionally include the separation prevention member 120 capable of firmly fixing the electromagnet 150 corresponding to the fixed part.

That is, one end of the electromagnet 150 is a fixed end fixed to the bracket 114 and the other end thereof is a free end, which results in an unstable structure. Therefore, the free end is changed to the fixed end by the addition of the separation prevention member connected to the case 112, such that the electromagnet 150 may be firmly fixed even in the case that an external shock, or the like, is applied thereto.

Herein, the separation prevention member 120 may be formed of a magnetic or a non-magnetic material. In the case that the separation prevention member 120 is formed of a magnetic material, the separation prevention member 120 may act as the yoke to smooth the flow of magnetic flux. In addition, in the case that the separation prevention member 120 is formed of a non-magnetic material, the separation prevention member 120 can prevent the leakage of magnetic flux.

In addition, at least a portion of the separation prevention member 120 may be formed of an elastomer to act as a shock absorbing member. That is, the separation prevention member 120 is inserted between the other end of the electromagnet 150 and the case 112. Therefore, when the separation prevention member 120 is formed of a material having elastic force to a certain degree, the separation prevention member 120 is interposed between the other end of the electromagnet 150 and the case 112 and then elastically recovered, thereby more firmly fixing the electromagnet 150.

Here, at least a portion of the separation prevention member 120 is formed of a material capable of absorbing shock such as rubber, silicon, cork, propylene, poron, and the like, or may be configured as a spring having elastic force, and the like.

Meanwhile, the housing 110 includes the external wall 112a protruded to the internal space and the separation prevention member 120 may be inserted into the interior of the external wall 112a. The external wall 112a may more firmly fix the separation prevention member 120. In addition, the external wall 112a may also act to guide the position of the separation prevention member 120.

In addition, referring to FIG. 3, the linear vibrator 200 according to the embodiment of the present invention may further include a shock absorbing member 121 inserted between the separation prevention member 120 and the other end of the electromagnet 150.

That is, even in the case that the separation prevention member 120 does not include an elastomer, the additional shock absorbing member is provided to obtain a shock absorbing effect. The separation prevention member 120 is inserted between the other end of the electromagnet 150 and the case 112. In the case in which the separation prevention member 120 is formed of a rigid body, a gap is inevitably formed, even in the case that the separation prevention member 120 is inserted between the other end of the electromagnet 150 and the case 112, such that the electromagnet 150 may be separated due to an external shock, or the like. Therefore, the shock absorbing member 121 having elastic force may additionally be inserted between the electromagnet 150 and the separation prevention member 120 to allow the separation prevention member 120 to be inserted between the other end of the electromagnet 150 and the case 112 and then, elastically recover the shock absorbing member 121, thereby more firmly fixing the electromagnet 150.

Here, the shock absorbing member 121 is formed of a material such as rubber, silicon, cork, propylene, poron, and the like, capable of absorbing shocks, or may be configured as a spring having elastic force, and the like.

Figure 4:
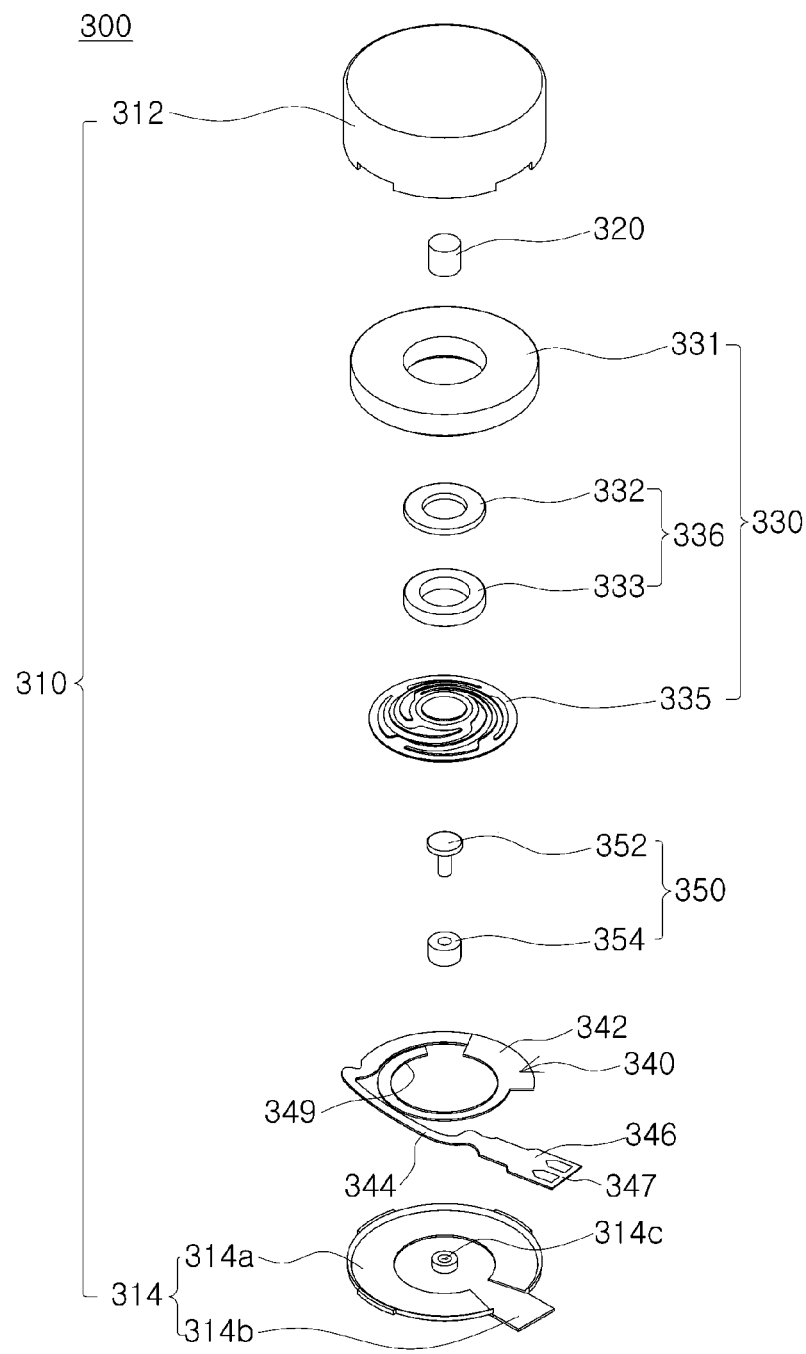
FIG. 4 is an exploded perspective view illustrating a linear vibrator according to an embodiment of the present invention.
Figure 6:
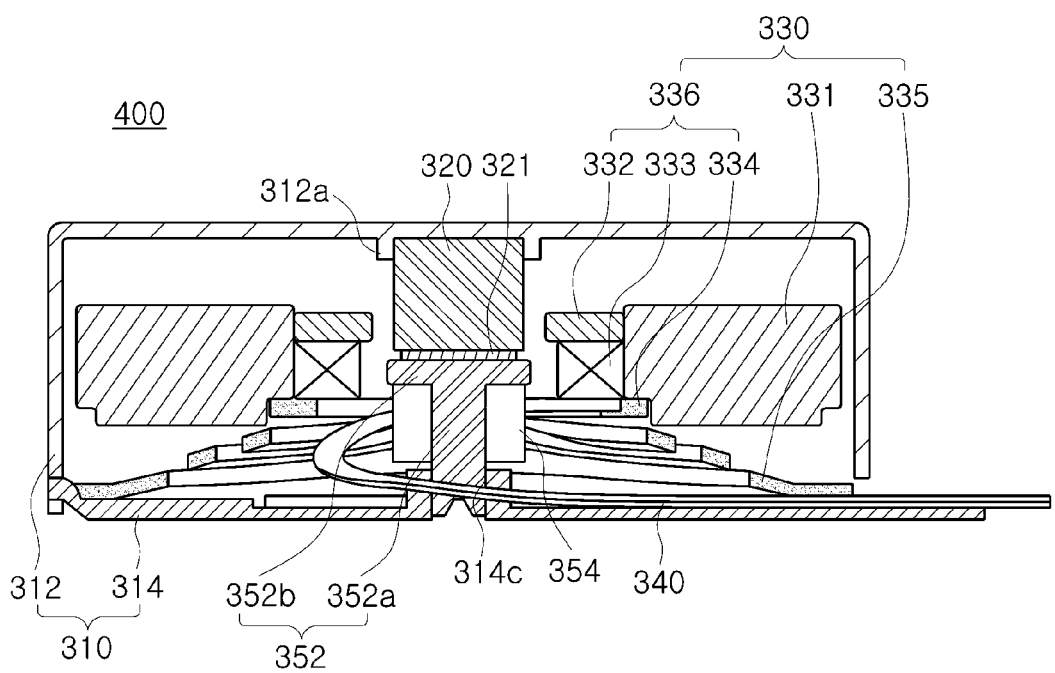

FIG. 4 is an exploded perspective view illustrating a linear vibrator according to an embodiment of the present invention, and FIGS. 5 and 6 are cross-sectional views illustrating a linear vibrator according to an embodiment of the present invention.

When linear vibrators 300 and 400 according to an embodiment of the present invention are compared with the linear vibrators 100 and 200 illustrated in FIGS. 1 through 3, the electromagnet and the magnetic field part are positioned opposite to each other.

That is, the linear vibrators 100 and 200 of FIGS. 1 through 3 have a structure in which the magnetic field part 136 including the magnet 133 is mounted in the vibrating part 130 and the electromagnet 150 is mounted in the housing 110 (the bracket 114), the fixed part. On the other hand, the linear vibrators 300 and 400 of FIGS. 4 through 6 have a structure in which an electromagnet 336 is mounted in a vibration part 330 and a magnetic field part 350 including a magnet 354 is mounted in a housing 310 (a bracket 314), the fixed part.

Referring to FIGS. 4 and 5, the linear vibrator 300 according to the embodiment of the present invention may include the housing 310 forming an interior of the linear vibrator 300, the vibrating part 330 including a mass body 331, an elastic member 335 and the electromagnet 336, the magnetic field part 350 including a yoke 352 and the magnet 354, and a substrate 340 for supplying power to the electromagnet 336. In addition, in the embodiment of the present invention, a separation prevention member 320 may be interposed between the magnetic field part 350 and the housing 310.

Here, the electromagnet 336 may include an upper plate 332 acting as a yoke and a coil 333. Further, the magnetic field part 350 may include the yoke 352 and the magnet 354.

The housing 310 may include the case 312 having an opened portion and providing an internal space having a predetermined volume and a bracket 314 joined to the opened portion of the case 312 to seal the internal space formed by the case 312.

Here, the internal space may accommodate the magnetic field part 350, the vibrating part 330, and the like, and the case 312 and the bracket 314 may also be formed integrally.

In addition, the bracket 314 may include a sealing portion 314a sealing the opened portion of the case 312 and a protruding portion 314b protruded to the outside of the case 312 after being joined to the case 312.

Meanwhile, an external wall 312a is provided on a top surface of the case 312 to be protruded downwardly to correspond to an external edge of the separation prevention member 320 to be described below to thereby allow the external circumferential surface of the separation prevention member 320 to be fitted into an internal surface of the external wall 312a, such that the external wall 312a of the case 312 can be more firmly joined to the separation prevention member 320.

The magnetic field part 350 may be fixed to the housing 310 so as to be mounted in the internal space of the housing 310. The magnetic field part 350 may be joined to the housing 310 (may be mounted in the case 312 or on the bracket 314) by at least one of bonding, press fitting, and welding.

The magnetic field part 350 may have an external diameter smaller than internal diameters of the upper plate 332 and the coil 333 forming the electromagnetic 336 and may act as a fixed member by being joined to the housing 310 (the case 312 or the bracket 314).

In this configuration, the magnetic field part 350 may be configured to include the yoke 352 fixed to the housing 310 and the magnet 354 inserted into the yoke 152. The yoke 352 may be provided so as to smooth a flow of magnetic flux during a process of generating electromagnetic force by interaction between the magnet 354 and the coil 333 of the vibrating part 330.

Meanwhile, although not shown, the magnetic field part 350 may include a magnet of which one end is mounted in the housing 310. Here, the other end of the magnet may be provided with the yoke.

One end of the yoke 352 may be inserted into a seating groove or a seating hole 314c formed in the housing 310. Further, the yoke 352 may be fixed to the housing 310 using various methods such as bonding, press-fitting, welding, and the like, but the present invention is not limited thereto. FIGS. 4 and 5 show that the yoke 352 is inserted into the seating hole 314c formed in the bracket 314, but the present invention is not limited thereto. Therefore, the seating hole may be provided as a seating groove and may fix the yoke to the housing rather than to the bracket.

Further, the yoke 352 may include a body 352a inserted into the housing 310 and a flange 352b protruded outwardly from the other end of the body 352a in the outer radial direction. Here, the flange 352b may be disposed to face the coil 333 of the vibrating part 330. This configuration of the yoke 352 may smooth the flow of magnetic flux during the process of generating electromagnetic force through interaction between the magnet 354 and the coil 333.

Here, the yoke 352 may be formed of a magnetic material.

The vibrating part 330 may include the mass body 331, the elastic member 335, and the electromagnet 336. Here, the electromagnet 336 may include the upper plate 332 and the coil 333.

One end of the elastic member 335 may be fixed to the mass body 331 having the electromagnet 336 mounted therein and the other end thereof may be fixed to the housing 310 (fixed to the case 312 or the bracket 314).

The electromagnet 336 is fixed to the interior of the mass body 331 to interact with the magnetic field part 350 fixed to the housing 310 so as to face the interior of the electromagnet 336, such that the electromagnet 336 may be implemented to vibrate the vibrating part 330 relative to the magnetic field part 350 via the elastic member 335.

That is, the vibrating part 330 may be a member that can vibrate vertically via the elastic member 335.

Here, the upper plate 332 and the coil 333 may have an internal diameter larger than the external diameter of the magnetic field part 350.

In detail, the electromagnet 336 may be disposed to face the magnetic field part 350 and at least a portion of the magnetic field part 350 may be inserted into a space formed by the electromagnet 336.

Therefore, the magnetic field part 350 and the electromagnet 336 may maintain a state of non-contact during the movement of the vibrating part 330.

Further, the coil 333 may be joined to an internal circumferential surface of a hollow of the mass body 331.

The mass body 331 is a vibrating body that is vibrated vertically. When the mass body 331 is vibrated vertically, the mass body may be provided to have an external diameter smaller than an internal diameter of the internal circumferential surface of the case 312 so as to be vibrated without coming into contact in the housing 310.

Therefore, a gap having a predetermined size may be formed between the internal circumferential surface of the case 312 and the external circumferential surface of the mass body 331.

The mass body 331 may be formed of a non-magnetic material or a paramagnetic material that is not affected by magnetic force generated by the magnet 354.

Therefore, the mass body 331 may be formed of a material such as tungsten having a heavier specific gravity than iron, which increases a mass of the vibrating part 330 without an increase in volume to control a resonance frequency, thereby maximizing a vibration quantity.

However, a material of the mass body 331 is not limited to tungsten and therefore, various materials can be used according to designer's intention.

Here, in order to calibrate a natural frequency of the linear vibrator 300, the mass body 331 is provided with a space into which a sub mass body may be additionally inserted, thereby increasing or reducing the mass of the mass body 331.

When current having a predetermined frequency is applied to the coil 333, a magnetic field may be induced around the coil 333. In this case, when electromagnetic force is propagated through the coil 333, a direction of magnetic flux through the coil 333 from the magnet 354 is horizontal and the magnetic field generated by the coil 333 is vertical, to vibrate the vibrating part 330 vertically.

Therefore, the magnetic flux direction of the magnet 354 and the vibration direction of the vibrating part 330 are perpendicular with respect to each other.

That is, when electromagnetic force having the same frequency as the natural mechanical frequency of the vibrating part 330 is formed, the vibrating part 330 may be resonance-vibrated to obtain a maximum quantity of vibrations and the natural frequency of the vibrating part 330 is affected by the mass of the vibrating part 330 and an elasticity modulus of the elastic member 335.

Here, current, namely, external power having a predetermined frequency, applied to the coil 333, may be provided by the substrate 340 electrically connected to the coil 333, which will be described below.

As described above, the elastic member 335 is joined to the mass body 331 and the housing 310 (the case 312 or the bracket 314) and provides elastic force, wherein the natural frequency of the vibrating part 330 is affected by the elasticity modulus of the elastic member 335.

Here, the elastic member 335 may be one of a coil spring and a leaf spring, but the present invention is not limited thereto. Therefore, it is to be noted that any member capable of providing elastic force may be used without limitation.

The substrate 340 may be coupled to one surface of the mass body 331 configuring the vibrating part 330 and may include a through hole 349 passing through the magnet 354 so that the substrate 340 does not contact the magnetic field part 350 at the time of the vibration of the vibrating part 330.

That is, the through hole 349 may prevent contact between the magnetic field part 350 and the substrate 340 and may secure the maximum quantity of vibrations of the vibrating part 330 without limiting amplitude at the time of the vibration and movement of the vibrating part 330.

Therefore, the linear vibrator 300 according to the embodiment of the present invention can obtain more stable linear vibrations by the through hole 349.

In detail, one end of the substrate 340 may be coupled to the vibration part 330 so as to be a free end and the other end thereof may be coupled to the protruding portion 314b of the bracket 314 so as to be a fixed end.

Here, describing the substrate 340 in more detail, the substrate 340 may be a flexible printed circuit board and may include a moving piece 342 coupled to the mass body 331 of the vibrating part 330, a fixed piece 346 coupled to the protruding portion 314b of the bracket 314, and a connecting piece 344 connecting the moving piece 342 and the fixed piece 346 to each other.

The moving piece 342 may be a free end as a portion vibrated by cooperating with the vibrating part 330 and a top surface of the moving piece 342 may contact a bottom surface of the mass body 334.

In addition, the internal space formed by the moving piece 342 may refer to the above-mentioned through hole 349.

A top surface of the fixed piece 346 may be provided with a power connection terminal 347 for supplying power to the coil 333 and may be protruded to the outside of the case 312.

Therefore, the fixed piece 346 of the substrate 340 may be coupled to the protruding portion 314b.

In addition, the substrate 340 may include the connecting piece 344 connecting the moving piece 342 and the fixed piece 346 to each other, wherein the moving piece 342 may be vibrated vertically while the connecting piece 344 is pivoted in a circumferential direction of the moving piece 342 from an end of the fixed piece 346 at a predetermined gap with respect to an edge of the moving piece 342.

In addition, the bottom surface of the substrate 340 may be provided with an electrode pad (not shown) for transferring an electrical signal having a specific frequency to the coil 333 and the electrode pad may be electrically connected to a lead wire of the coil 333.

Here, the electrode pad may be formed further outwardly than the external edge of the coil 333 and the electrode pad and the lead wire of the coil 333 may be electrically connected to each other by soldering.

In other words, the electrode pad may be formed on the bottom surface of the moving piece 342 of the substrate 340 to be coupled to the lead wire of the coil 333.

Therefore, the lead wire of the coil 333 does not affect vibrations and movement of the linear vibrator 300 according to the embodiment of the present invention by coupling the electrode pad of the substrate 340 to the outside of the coil 333.

The separation prevention member 320 may be interposed between the other end of the magnetic field part 350 and the housing 310. In detail, when the other end of the magnetic field part 350 is fixed to the bracket 314, the separation prevention member 320 may be interposed between the other end of the magnetic field part 350 and the case 312.

The linear vibrator mounted in the internal space of the housing 310 is largely divided into the vibrating part and the fixed part, wherein the fixed part is fixed to the housing and the vibrating part is vibrated by the electromagnetic interaction with the fixed part. In this configuration, the fixed part fixed to the housing may be separated from the housing due to an external shock applied to the linear vibrator, and the like. Therefore, the present invention may additionally include the separation prevention member 320 capable of firmly fixing the magnetic field part 350 corresponding to the fixed part.

That is, one end of the magnetic field part 350 is a fixed end fixed to the bracket 314 and the other end thereof is a free end, which results in an unstable structure. Therefore, the free end is changed to the fixed end by the addition of the separation prevention member connected to the case 312, such that the magnetic field part 350 may be firmly fixed even in the case that an external shock, or the like, is applied thereto.

Herein, the separation prevention member 320 may be a magnetic or a non-magnetic material. When the separation prevention member 320 is formed of a magnetic material, the separation prevention member 320 may act as a yoke to smooth the flow of magnetic flow. In addition, when the separation prevention member 320 is formed of a non-magnetic material, the separation prevention member 320 may prevent the leakage of magnetic flux.

In addition, at least a portion of the separation prevention member 320 may be formed of an elastomer to act as a shock absorbing member. The separation prevention member 320 is inserted between the other end of the magnetic field part 350 and the case 312. Therefore, when the separation prevention member 320 is formed of a material having elastic force to a certain degree, the separation prevention member 320 is interposed between the other end of the magnetic field part 350 and the case 312 and then elastically recovered, thereby more firmly fixing the magnetic field part 350.

Here, at least a portion of the separation prevention member 320 may be formed of a material having elastic force such as rubber, silicon, spring, and the like.

Meanwhile, the housing 310 includes the external wall 312a protruded to the internal space and the separation prevention member 320 may be inserted into the interior of the external wall 312a. The external wall 312a may more firmly fix the separation prevention member 320. In addition, the external wall 312a may also act to guide the separation prevention member 320 during the positioning thereof.

In addition, referring to FIG. 6, the linear vibrator 400 according to the embodiment of the present invention may further include a shock absorbing member 321 that is inserted between the separation prevention member 320 and the other end of the magnetic field part 350.

That is, even in the case that the separation prevention member 320 does not include an elastomer, the additional shock absorbing member is provided to obtain a shock absorbing effect. That is, the separation prevention member 320 is inserted between the other end of the magnetic field part 350 and the case 312. However, in a case in which the separation prevention member 320 is formed of a rigid body, a gap is inevitably formed, even in the case that the separation prevention member 320 is inserted between the other end of the magnetic field part 350 and the case 312, such that the magnetic field part 350 may be separated due to an external shock, and the like. Therefore, the shock absorbing member 321 having elastic force is additionally inserted between the magnetic field part 350 and the separation prevention member 320 to allow the separation prevention member 320 to be inserted between the other end of the magnetic field part 350 and the case 312 and then, elastically recover the shock absorbing member 321, thereby more firmly fixing the magnetic field part 350.

Here, the shock absorbing member 321 may be formed of various materials having elastic force such as rubber, silicon, spring, and the like.

As set forth above, according to embodiments of the present invention, a linear vibrator capable of maintaining a state in which a fixed part is firmly fixed to a housing even in the case that an external shock, and the like, is applied thereto.

While the present invention has been shown and described in connection with the embodiments, it will be apparent to those skilled in the art that modifications and variations can be made without departing from the spirit and scope of the invention as defined by the appended claims.

What is claimed is:
1. A linear vibrator, comprising:
a housing providing an internal space;
an electromagnet having one end fixed to the housing so as to be disposed in the internal space;
a vibrating part including a magnet facing the electromagnet and interacting therewith;
an elastic member having one end fixed to the housing and the other end fixed to the vibrating part and elastically supporting the vibrating part during vibrating thereof; and
a separation prevention member interposed between the other end of the electromagnet and the housing, and
a shock absorbing member inserted between the separation prevention member and the other end of the electromagnet.

2. The linear vibrator of claim 1. wherein at least a portion of the separation prevention member is formed of an elastomer.

3. The linear vibrator of claim 1, wherein the separation prevention member is formed of a magnetic material.

4. The linear vibrator of claim 1, wherein the separation prevention member is formed of a non-magnetic material.

5. The linear vibrator of claim 1, wherein the housing includes an external wall protruded into the internal space, and the separation prevention member is inserted into an interior of the external wall.

6. The linear vibrator of claim 1, wherein the electromagnet includes a yoke fixed to the housing and a coil wound around the yoke.

7. The linear vibrator of claim 6, wherein one end of the yoke is inserted into a seating groove or a seating hole formed in the housing.

8. The linear vibrator of claim 6, wherein the other end of the yoke is provided with a flange protruded in an outer radial direction.

9. The linear vibrator of claim 8, wherein the flange is disposed to face the magnet.

\* \* \* \* \*